(12) United States Patent
Klaiman

(10) Patent No.: US 10,846,848 B2
(45) Date of Patent: Nov. 24, 2020

(54) SYSTEM FOR BRIGHT FIELD IMAGE SIMULATION

(71) Applicant: Eldad Klaiman, Starnberg (DE)

(72) Inventor: Eldad Klaiman, Starnberg (DE)

(73) Assignee: Hoffman-La Roche Inc., Little Falls, NJ (US)

( * ) Notice: Subject to any disclaimer, the term of this patent is extended or adjusted under 35 U.S.C. 154(b) by 185 days.

(21) Appl. No.: 16/304,979

(22) PCT Filed: Jun. 9, 2017

(86) PCT No.: PCT/EP2017/064193
§ 371 (c)(1),
(2) Date: Nov. 27, 2018

(87) PCT Pub. No.: WO2017/212055
PCT Pub. Date: Dec. 14, 2017

(65) Prior Publication Data
US 2020/0327657 A1    Oct. 15, 2020

(30) Foreign Application Priority Data
Jun. 10, 2016   (EP) .................................. 16174025

(51) Int. Cl.
*G06T 5/50*     (2006.01)
*G06T 7/00*     (2017.01)

(52) U.S. Cl.
CPC .............. *G06T 7/0012* (2013.01); *G06T 5/50* (2013.01); *G06T 2207/10036* (2013.01);
(Continued)

(58) Field of Classification Search
CPC ................ G06T 7/0012; G06T 5/50; G06T 2207/10064; G06T 2207/10056;
(Continued)

(56) References Cited

U.S. PATENT DOCUMENTS

| | | | |
|---|---|---|---|
| 2008/0038771 A1* | 2/2008 | Taylor | G01N 33/96 435/40.5 |
| 2011/0074944 A1 | 3/2011 | Can et al. | |
| 2013/0044933 A1 | 2/2013 | Kenny | |

FOREIGN PATENT DOCUMENTS

| | | |
|---|---|---|
| JP | 2002/544531 A | 12/2002 |
| JP | 2013/506129 A | 2/2013 |
| JP | 2013/507612 A | 3/2013 |
| JP | 2014/521979 A | 8/2014 |

(Continued)

OTHER PUBLICATIONS

Hao Xu, Chuang Chen, Yue He, Hong-Wu Tang, Zhi-Ling Zhang, Yan Li, and Dai-Wen Pang: "Analysis of Cancer Marker in Tissues with Hadamard Transform Fluorescence Spectral Microscopic Imaging"; Feb. 7, 2015; J Flouoresce (2015) 25:397-402. (Year: 2015).*

(Continued)

*Primary Examiner* — Siamak Harandi
(74) *Attorney, Agent, or Firm* — Harness, Dickey & Pierce, P.L.C.

(57) ABSTRACT

An image processing system configured to receive a first fluorescence image generically indicating the presence of biological matter; transform the first image into a transformed first image having a first color; for each of the biomarkers, receive a respective second fluorescence image indicating signals emitted by fluorescence stain selectively staining the biomarker, transforming the second images into a respective transformed second images having a respective second color; overlaying and combining the transformed first and second images; storing and/or displaying the combined image as the simulated digital bright field IHC or ISH image. The first image is created using an autofluorescence reference spectrum of the tissue sample or of a similar tissue sample or by using a fluorescence reference spectrum of a first stain which generically binds to biological matter of the (Continued)

tissue sample for spectrally unmixing of a multi-spectral digital image of the tissue sample.

19 Claims, 4 Drawing Sheets

(52) U.S. Cl.
CPC ........... *G06T 2207/10056* (2013.01); *G06T 2207/10064* (2013.01); *G06T 2207/30024* (2013.01); *G06T 2207/30204* (2013.01)

(58) Field of Classification Search
CPC . G06T 2207/10036; G06T 2207/30204; G06T 2207/30024
See application file for complete search history.

(56) References Cited

FOREIGN PATENT DOCUMENTS

JP    2015/514212 A    5/2015

OTHER PUBLICATIONS

Office Action dated Feb. 4, 2020, issued in corresponding Japanese Patent Application No. 2018-563572.
Written Opinion for PCT/EP2017/064193 Filed Jun. 9, 2017.
International Search Report for PCT/EP2017/064193 Filed Jun. 9, 2017.
International Preliminary Report on Patentability for PCT/EP2017/064193 dated Dec. 20, 2018.

* cited by examiner

Fluorescent Image → Image Transformation → "Simulated" H&E stained Brightfield Image

SYSTEM FOR BRIGHT FIELD IMAGE SIMULATION

FIELD OF THE INVENTION

The invention relates to the field of digital image processing, and more particularly to the processing of fluorescence images of IHC or ISH tissue samples.

BACKGROUND AND RELATED ART

Fluorescence imaging is the visualization of fluorescence dyes or proteins as labels for molecular processes or structures. It enables a wide range of experimental observations including the location and dynamics of gene expression, protein expression and molecular interactions in cells and tissues.

With the advancement of new staining kits and imaging technologies in the field of fluorescence microscopy, a large number of fluorescence stains having different colors are available and a huge diversity of microscopy images are generated comprising complex patterns generated by many different fluorescence stains.

Most pathologists are still not trained in the viewing, analysis and diagnosis of such new images. The increased variability of fluorescence images may result in diagnostic errors. For example, a pathologist may work in a laboratory that regularly stains a particular tumor marker with a particular florescent stain having a red color. Stroma cells are stained in green. Now this pathologist may start a new job in a laboratory that regularly stains immune cells in "red", the tumor cells in blue and the stroma cells in green. Or the laboratory may have simply changed the staining protocol without notifying the pathologist on that change. As a consequence, the pathologist may erroneously consider the immune cells as cancer cells and may generate a wrong diagnosis and a wrong treatment recommendation.

US patent applications US 2013/0044933 A1 and US 201110074944 A1 disclose a method for generating a brightfield type image, which resembles a brightfield staining protocol of a biological sample, using fluorescent images. The method comprise acquiring fluorescent images of a biological sample, mapping said fluorescent images into a brightfield color space, generating a brightfield image, and optionally applying a sharpening transformation correction. The present invention is directed to facilitate and improve pathological viewing, analysis and diagnosis of tissue samples stained with one or more fluorescence stains.

SUMMARY

It is an objective of the present invention to provide for an improved method and system for fluorescence digital image processing as specified in the independent claims. Embodiments of the invention are given in the dependent claims. Embodiments of the present invention can be freely combined with each other if they are not mutually exclusive.

In one aspect, the invention relates to a method of generating a simulated digital bright field IHC or ISH image from digital, monochromatic, fluorescence images of a tissue sample. The tissue sample comprises one or more stained biomarkers. Each of the stained biomarkers is stained by a respective fluorescence stain. The method is performed by an image processing system and comprises:
  receiving a first one of the fluorescence images of the tissue sample, the pixel intensities of the first image being generically indicative of the presence of biological matter;
  transforming the first image into a transformed first image having a first color;
  for each of the stained biomarkers, receiving a respective second one of the fluorescence images of the tissue sample, the pixel intensities of each second image being selectively indicative of fluorescence signals emitted by the fluorescence stain that selectively stains said biomarker,
  transforming each of the second images into a respective transformed second image having a respective second color;
  overlaying and combining the transformed first and one or more second images;
  storing the combined image as the simulated digital bright field IHC or ISH image in a storage medium; and/or
  displaying the combined image as the simulated digital bright field IHC or ISH image on a display device.

Said features may be advantageous as the risk of a wrong diagnosis and treatment recommendation generated by a pathologist inspecting the images may greatly be reduced: pathologists routinely work with brightfield microscopy images of tissues stained with various staining assays, e.g. hematoxylin and eosin (H&E). In bright field imaging, some typical colors like hematoxylin-blue and/or eosin-red always represent the same types of cells and tissue types. Pathologists are used to interpret some colors generated by bright field imaging stains, e.g. by a H&E staining, as signals indicating the presence of tissue sections and individual cells within the tissue. This information is used as a kind of "visual guide" that allows a pathologist to discriminate tissue sections from the tissue slide glass and to discriminate intra- and extra-cellular regions within a tissue.

For example, hematoxylin is a dark blue or violet stain that is basic/positive. It binds to basophilic substances (such DNA/RNA—which are acidic and negatively charged). DNA/RNA in the nucleus, and RNA in ribosomes in the rough endoplasmic reticulum are both acidic because the phosphate backbones of nucleic acids are negatively charged. The negatively charged backbones form salts with basic dyes containing positive charges. Therefore, dyes like hematoxylin will bind to DNA and RNA and stain them violet.

Eosin is a red or pink stain that is acidic/negative. It binds to acidophilic substances such as positively charged amino acid side chains (e.g. lysine, arginine). Most proteins in the cytoplasm are basic because they are positively charged due to the arginine and lysine amino acid residues. These form salts with acid dyes containing negative charges, like eosin. Therefore, eosin binds to these amino acids/proteins and stains them pink. This includes cytoplasmic filaments in muscle cells, intracellular membranes, and extracellular fibers.

So, in bright field image microscopy using H&E staining, a fixed and reliable association between biological structures and the staining color exists, for example;
  Nuclei in blue/purple,
  Basophils in purplish red,
  Cytoplasm in red,
  Muscles in dark red,
  Erythrocytes in cherry red,
  Collagen in pale pink,
  Mitochondria in pale pink.

To the contrary, in fluorescence imaging, there does not exist a fixed association between biological structures and a particular color. This has been observed as an important potential source of error and at least as a factor that reduces the productivity of a pathologist as he or she has to carefully review the meaning of a particular color for each individual image or set of images.

By transforming intensity information corresponding to a particular (and typically arbitrary chosen) fluorescence stain in dependence on the biological structures they represent (e.g. generically the presence of biological matter or specifically a particular biomarker of interest) into a predefined color that is known to represent said particular biological structure, a pathologist can rely on the fact that a particular stain represents a particular biological structure. This may ease the interpretation of fluorescence images by a pathologist, may help avoiding errors and increase the productivity of the pathologist.

According to embodiments, the first color is a predefined color that is stored in a configuration data structure, e.g. a configuration file or a set of configuration database records. The configuration data structure specifies that the first color generically represents the presence of biological matter (irrespective of the type of the cell or tissue contained in said biological matter). Preferentially, the same first color is used as the color that generically indicates the presence of biological matter for generating the simulated digital bright field IHC or ISH image for a plurality of different digital images derived from multiple different tissue samples. The multiple different tissue samples can be derived from the same or from different patients. Thus, the pathologist can get used to this particular first color as being an indicator of the presence of biological matter, i.e., as an indicator of the presence of tissue on a tissue slide.

According to embodiments, the second color is a predefined color that is stored in the configuration data structure. The configuration data structure assigns each of a plurality of biomarkers, e.g. a particular protein like FAP, to a respective second color. Each of the second color specified in the configuration data structure are used as the particular color that indicates the presence of the particular biomarker for generating a simulated bright field image from the images of multiple different tissue samples, whereby the samples can be derived from the same or from different patients and whereby the same or different fluorescence stains may have been used for staining said particular biomarker.

As the original fluorescence stain indicating the presence of a particular biomarker is always transformed into the particular second color assigned to said biomarker in the configuration data structure, a biomarker-positive cell is always highlighted in the generated simulated bright field image in the second color.

Preferentially, the configuration data structure is editable by a pathologist. Thus, the pathologist can constantly assign a predefined second color, e.g. "green", to a particular biomarker and thus can become accustomed to immediately recognize "green" cells as FAP+ cells irrespective of the actual fluorescence stain that was used for staining the FAP biomarker.

In effect, the pathologist can get used to each of the particular second colors as being an indicator of the presence of particular, respectively assigned biomarker.

In bright field imaging, the stains that are typically used are linked via their physic-chemical properties to defined biological structures, e.g. acidic or basic tissue or cell components. By using additional image transformation steps which assign a particular, predefined color to a fluorescence image in dependence on the biological material that is identified by the respective fluorescence stain that has generated the fluorescence image, characteristic features of a "bright field image" are simulated, i.e., the interrelation of biological structure and the color of the resulting image.

At least some of the embodiments described in the following comprise additional steps and features which further increase the "bright field image" character of the image that is simulated using a plurality of fluorescence images as input.

According to embodiments, the pixel intensities of the first image are selectively indicative of autofluorescence signals emitted by biological matter in the tissue sample.

Autofluorescence is the natural emission of light by biological structures such as mitochondria and lysosomes when they have absorbed light. Typically, autofluorescence is considered as an unwanted signal in fluorescence microscopy as autofluorescence signals constitute a kind of "noise signals" that may hide the actually desired signal of the fluorescence stain (that may or may not have stained a particular biomarker in dependence on the expression level of said biomarker in the tissue sample). It has surprisingly been observed that in the context of the present invention, the autofluorescence ("noise") signals actually convey desired information, i.e., can be used as a generic indicator of the presence of tissue (vs. regions of a glass slide being devoid of any tissue sample). Thus, the autofluorescence information can be used in replacement of and for simulation of a generic tissue stain used in bright field image microscopy. An example of such a generic stain is eosin described above. However, depending on the biological material examined, there may be different "generic tissue stains" that are simulated by choosing a first color that represents said "generic tissue stain" used in bright field imaging.

According to embodiments, the pixel intensities of the first image are selectively indicative of fluorescence signals emitted by a first fluorescence stain which generically binds to biological matter of the tissue sample. For example, the first fluorescence stain generically binding to biological matter could be an arbitrary fluorescence stain of arbitrary fluorescent color that is coupled to an antibody expected to stain all cells of the tissue type from which the tissue is derived. Alternatively, said fluorescence stain could be coupled to a non-specifically binding antibody.

Identifying and indicating the presence of tissue sections on a slide and representing it with a constant "first color" indicating the presence of biological matter may assist a pathologist in evaluating the distribution of some biomarker-positive cells before the background of the "stroma" or "background" cells of the tissue sample.

According to embodiments, the method further comprises generating the first image by overlaying and combining the pixel intensities of two or more of the second images, said two or more second images having been received for two or more of the biomarkers. Said two or more biomarkers comprise:

one or more cytosolic biomarkers (i.e., biological molecules present in the cytosol);

and optionally one or more nuclear biomarkers (i.e., biological molecules present in the nucleus) and/or one or more membrane biomarkers (i.e., biological molecules spanning or being attached to a cell membrane).

Generating the first image as a combination of two or more fluorescence images corresponding to at least one cytosolic biomarker and at least one nuclear and/or membrane biomarker may be advantageous as it is neither necessary to extract the autofluorescence signal from nor is it necessary to use additional generic stains which might interfere with the other, biomarker-specific stains. Rather, the first fluorescence image that generically indicates the presence of biological matter (in contrast to the regions of the tissue slide not covered by any tissue) us computationally generated from a plurality of fluorescence signals and corresponding images that were originally received for detecting the presence of individual biomarkers. For example, the tissue may be stained with 6 different fluorescence stains S1, S2, ..., S6. Each of said 6 stains has a different color C1, C2, C6 and selectively binds to a specific biomarker B1, B2, ..., B6. The original medical question that shall be solved by the pathologist may be the question if the cells of the tissue sample comprise tumor cells of a particular type having a characteristic biomarker expression profile $B1^+$, $B2^+$, $B3^-$, $B4^+$, $B5^-$ and $B6^-$. By combining the fluorescence signals ("images") of two, three or even all of the 6 biomarkers, a generic first image can be computed that is represented in the first color and may assist the pathologist in discriminating tissue vs. non-tissue regions on the slide and in discriminating inner-cellular vs. outer-cellular regions within the tissue.

In a further advantageous aspect, this approach can also be used in image acquisition systems which comprise a software- or hardware based filter mechanism for filtering out autofluorescence signals.

According to embodiments, the first color is the color of eosin used for generating a bright field image of an eosin-stained sample.

The "first color" representing the presence of biological matter having been stained by eosin in a bright field image of an eosin-stained sample can be specified as reddish, red, pink or an intermediate color between red and pink.

According to embodiments, the first color is selected from a group comprising: the color of eosin, the color of Coomassie Blue (a non-specific protein stain), Cresyl violet (staining acidic components of the neural cytoplasma), Congo Red (binding to cytosolic structures and being commonly used for staining fat tissue), methylene blue (staining of animal cells), Sudan Black (binding to fat molecules), acid fuchsin (binding to elastin or mitochondria) or other examples.

According to embodiments, each of the one or more second colors is selected from a group comprising:
the color of DAB used for generating a bright field image of a DAB (diaminobenzidine)-stained sample; DAB generates a brown or "brown-red" end product;
the color of 3-AMINO-9-ETHYLCARBAZOLE (AEC) which forms, upon oxidation, a rose-red end product;
the color of 4-CHLORO-1-NAPHTHOL (CN) which precipitates as a blue end product;
the color of p-PHENYLENEDIAMINE DIHYDROCHLORIDE/pyrocatechol which gives a blue-black reaction product;
the color of fast red TR producing a light red end product;
the color of fast blue BB producing a blue end product;
the color of New Fuchsin producing a light red end product;
the color of Fast Garnet GBC producing a garnet end product;
the color of Nitro Blue Tetrazolium (NBT) producing a blue end product; and
the color of iodonitrotetrazolium Violet (INT) producing a violet end product.

Alternatively, also a plurality of other colors that correspond to other, here not listed but well known stains used in bright field microscopy can be used.

Any of the above listed colors refer to colors of the respectively listed stain if viewed under bright field image conditions. The "color" of a stain used in bright field image microscopy is the spectral profile emitted by biological material having been stained with said stain and being illuminated by a bright field microscopy light source (typically a broad spectrum light source generating "white light"). Contrary to fluorescent microscopy, bright field microscopy is performed in a subtractive color mixture environment.

According to embodiments, at least one of the received second fluorescence images of the tissue sample consist of pixels whose pixel intensities are indicative of fluorescence signals emitted by a fluorescence stain (NIF stain) that emits fluorescent light in the near-infrared spectral range (from about 700 nm to 2500 nm). Embodiments of the invention may allow using NIF stains in addition to "conventional" fluorescence stains emitting in the visible spectral range without making any additional modifications of the system. Thus, a huge variety of fluorescence stains may be used, including NIF stains, but the image finally generated and presented to the pathologist may nevertheless reliably depict known biological structures and biomarkers with a predefined color the pathologist is acquainted with and which the pathologist may have specified in a configuration data structure himself.

According to embodiments, at least one of the one or more biomarkers is a nuclear biomarker and the second color of the second image received for said at least one biomarker is the color of hematoxylin in a bright field image of a hematoxylin-stained sample.

The "second color" representing the color of hematoxylin-stained structures in a bright field image of a hematoxylin-stained sample can be specified as blue, purple or an intermediate color between blue and purple.

According to embodiments, the method further comprises receiving a third one of the fluorescence images of the tissue sample, the pixel intensities of the third image being selectively indicative of fluorescence signals emitted by a third fluorescence stain which selectively stains nuclear regions; and transforming the third image into a transformed third image having a third color. Thereby, the transformed first, third and the one or more second images are overlaid and combined to provide the combined image. For example, the third fluorescence stain which selectively stains nuclear regions could be a fluorescence stain of arbitrary color that binds to DNA or nuclear proteins such as histones.

Using an additional third image that corresponds to a fluorescence stain that selectively stains the nuclear regions (of any kind of cell) may be advantageous as it is possible to "simulate" known bright field image staining techniques for staining nuclear regions, e.g. for simulating hematoxylin staining. In case none of the biomarkers of interest (and thus, none of the second images), an additional nuclear specific fluorescence stain may be used solely for the purpose of staining the nuclei of any type of cells contained in the tissue in order to simulate a nucleus indicating signal as known from bright field imaging techniques. Thus, in case none of the biomarkers is a nuclear biomarker a further, "third" stain/color is used for providing the "nuclear image" as an optical guidance for the pathologist.

According to alternative embodiments, the method comprises:
generating a third image by overlaying and combining the pixel intensities of two or more of the second images, said two or more second images having been received for two or more of the biomarkers, said two or more biomarkers being nuclear biomarkers;

transforming the third image into a transformed third image having a third color;

wherein the transformed first, third and the one or more second images are overlaid and combined to provide the combined image.

This may be advantageous as in case two (or—preferentially—three or more) of the biomarkers are nuclear biomarkers, e.g. nuclear proteins, using an additional "third fluorescence stain" for generically staining the nuclei may be omitted, thereby simplifying the staining protocol.

Often, the biomarkers used for generating the second images are not expected to be expressed in all kind of cells. This is because biomarkers are typically selected in dependence on the biological or medical question to be answered by the pathologist such that the presence or absence of a specific combination of biomarkers is indicative of the type or state of a particular cell. By combining the information generated by two or more of the biomarkers, the chances are high that at least one of the nuclear biomarkers is expressed in the nuclei in each of the cells contained in the tissue sample. The higher the number of nuclear biomarkers that are stained by a respective fluorescence stain, the higher the likelihood that a combination of all said "nuclear images will be generically indicative of nuclei in any kind of cell (tumor and non-tumor) contained in the tissue sample.

According to embodiments, the third color is the color of hematoxylin in a bright field image of a hematoxylin-stained sample.

According to embodiments, the method further comprises performing a brightness inversion of each of the monochrome fluorescent images for respectively generating a brightness-inverted, monochrome fluorescent image, and performing the transformation on the brightness-inverted, monochrome fluorescent images for respectively generating the first and second and optionally third transformed images that are overlaid and combined for obtaining the simulated bright field image.

This may be advantageous as the generated inverted image even more accurately reflects the typical color composition and distribution of a bright field image. In a typical fluorescence image, the background regions (glass slide regions not covered by a tissue and tissue regions not stained by a fluorescence stain) are represented by black or very dark pixels. To the contrary, in bright field imaging, background regions (glass slide regions not covered by a tissue and tissue regions not stained by a conventional bright field image stain such as H&E) are represented as with or bright pixels.

Brightness invention is performed for transforming an input image (e.g. the monochrome fluorescent image) such that pixel intensity values become inverted: a pixel in the input image having the lowest possible value in a given range of allowed intensity values, e.g. "0", is transformed into the highest possible intensity value, e.g. "255". A pixel in the input image having the highest possible value in a given range of allowed intensity values, e.g. "255", is transformed into the lowest possible intensity value, e.g. "0". Thus, the black or dark background areas of the monochrome fluorescent images are transformed into white or at least bright background areas as known from bright field microscopy.

Various approaches for brightness inversion of digital images are known in the art. According to one example, performing the bright field inversion comprises computing, for each pixel P having an intensity value ("brightness value") $X_P$ in the input image, an inverted intensity value $Y_P$ according to:

$Y_P = L - X_P$,

The intensity value $X_P$ may be a value in a predefined range, e.g. in a range of 0-255. L is the maximum possible intensity value an input image pixel is allowed to have in the intensity encoding scheme used, e.g. 255. Thus, if $X_P$ is 200, $Y_P$ is 55. If $X_P$ is 40, $Y_P$ is 215.

According to another example, performing the bright field inversion comprises computing, for each pixel P having an intensity value ("brightness value") $X_P$ in the input image, an inverted intensity value $Y_P$ according to:

$$Y_P = L * \left( contrastp * \left( \left(1 - \frac{X_P}{L}\right)^{gammap} - 0.5 \right) + 0.5 \right) + brightnessp$$

Again, "L" is the maximum possible intensity value an input image pixel is allowed to have in the intensity encoding scheme used, e.g. 255. The parameters gammap, contrastp and brightnessp can be obtained heuristically by performing an intensity inversion of each of a plurality of "typical" monochrome fluorescent images into a respective intensity-inverted image. The plurality of brightness inverted images is reviewed by a plurality of pathologists. For each of the input images, one or more of the inverted images are selected that best reproduce the pixel brightness distribution observed in a bright field image. The parameters gammap, contrastp and brightnessp that were used for generating the selected images having the "best"/"most realistic" bright field micoscropy brightness distribution are identified. Optionally, an average gammap, an average contrastp and an average brightnessp is computed from the selected "best" parameters. Then, these selected and optionally averaged parameters are used for subsequently analyzed tissue samples for performing the intensity inversion. The typical images used by the pathologists for determining the three parameters preferentially but not necessarily show the same type of tissue like the tissue sample used for acquiring the fluorescent images. By heuristically determining the gammap, the contrastp and the brightnessp, an image brightness inversion technique is provided that highly accurately reproduces the brightness distribution in a bright field image.

According to embodiments, the second image of at least one of the nuclear biomarkers is used for generating the first image and for generating the third image. This may be advantageous as the information contained in a "nuclear biomarker" fluorescence image is used three times: once for simulating the first image generically indicating the presence of biologic matter ("simulated eosin stain"), once for simulating the image being indicative of cell nuclei ("simulated hematoxylin stain") and cone for providing one of the second images being indicative of the presence of the specific biomarker selectively stained by one of the second fluorescence stains.

According to embodiments, the method further comprises generating the one or more second image and/or the first image and optionally also generating the third image of the tissue sample, the generation comprising performing spectral unmixing of a multi-spectral digital image of the tissue sample.

For example, a multi-spectral image may be received and a color deconvolution algorithm is then applied on the multi-spectral image. The algorithm extracts the autofluorescence signal component and storing this component as the first image in a storage medium. In addition, the algorithm extracts, for each of the fluorescence stains used for selectively staining a respective biomarker, the corresponding fluorescence signal and stores this component as one of the second monochromatic digital images in the storage medium. Optionally, if a fluorescence stain that selectively stains the nuclear regions of any kind of cell is used, the algorithm extracts the corresponding fluorescence signal and stores this component as a further monochromatic digital image being indicative of the nuclear regions of any cells of the tissue sample in the storage medium for providing an image that may later be transformed into a simulated hematoxylin image.

According to embodiments, the method further comprises:

receiving an autofluorescence reference spectrum of the tissue sample or of a similar tissue sample and using the autofluorescence reference spectrum in the spectral unmixing for the generation of the first image; or receiving a first fluorescence reference spectrum of the first stain which generically binds to biological matter of the tissue sample; and using said first received fluorescence reference spectrum in the spectral unmixing for the generation of the first image;

receiving a second fluorescence reference spectrum of each of the fluorescence stains used for staining the one or more biomarkers; and using each of the received second fluorescence reference spectra for the generation of a respective one of the one or more monochromatic second image; and/or receiving a third fluorescence reference spectrum of a fluorescence stain used for staining the nuclear region; and using the received third fluorescence reference spectrum for the generation of the third image.

Thus, contrary to prior art systems where autofluorescence signals were typically filtered out or considered as noise, the autofluorescence signal may actively, by generating and using a reference spectrum for the autofluorescence signal, be extracted from a multispectral image and used for increasing the information content and quality of the image to be displayed to the pathologist.

According to embodiments, the image processing system accesses staining protocol data being indicative of the types of fluorescence stains used for staining the one or more biomarkers and optionally being indicative of the fluorescence stain used for generically staining the biologic matter and/or for staining the nuclear regions. In dependence on the fluorescence stains used according to the staining protocol data, the image processing system selecting one of a plurality of transformation procedures for generating the transformed first, one or more second and optionally the third images.

For example, the protocol data may indicate that a particular fluorescence stain like Fluorescein isothiocyanate, FIT was used for staining a particular protein like FAP, then the image processing system automatically selects and applies a color transformation algorithm configured for transforming typical "FIT" color into a second color assigned to the biomarker FAP in a configuration data structure. In addition, the protocol data may indicate that autofluorescence signals should be used as the first image and should be transformed into a typical "eosin" color in accordance with an assignment of "autofluorescence" signal to the color of eosin in the configuration data structure. Thus, the image processing system according to embodiments of the invention is configured to automatically evaluate and use the protocol data for performing the image transformations, thereby ensuring that irrespective of the staining protocol used, a particular biomarker will always have assigned the particular one of the second colors assigned to the biomarker in the configuration data structure.

According to embodiments, the staining protocol data is part of the configuration data structure. An automated sample staining system is coupled to and has write access to the staining protocol data and automatically stores staining protocol data, in particular the type of fluorescence stained used for staining a respective biomarker or used for generically staining nuclear regions and/or the presence of biological matter, whenever the sample staining systems stains one or more samples. Each biological sample may be placed on a slide comprising a bar code or another form of sample identifier that corresponds to a sample ID stored in the staining protocol data. The staining protocol data is automatically updated whenever a new biological sample is stained by storing the sample ID in association with the fluorescence stains used and with the biomarkers and other biological structures to which said stain is configured to bind (this may depend on the antibody or other form of carrier used to attach the stain to the biological structure, if any). The automated updating of the staining protocol data by the automated sample staining system in combination with the automated evaluation of the staining protocol data and of the configuration data structure may be advantageous as it is automatically ensured that the image processing system selecting a transformation procedure being suitable for generating the transformed first, second and third images which represent biological structures in colors the pathologists is acquainted with.

According to some embodiments, the third fluorescence stain which selectively stains nuclear regions is a fluorescence stain selectively binding to Ki67 protein, a nuclear protein associated with cellular proliferation.

According to some embodiments, the one or more biomarkers are selected from a group comprising FAP, PanCK, CD34, CD3, CD4, CD8, CSF1R, DR5, KI67, Perforin, CC3, and others. For example, the FAP gene product (Fibroblast activation protein) is a membrane protein whose expression is seen on activated stromal fibroblasts of more than 90% of all human carcinomas. Stromal fibroblasts play an important role in the development, growth and metastasis of carcinomas. In bright field imaging, FAP is often stained with DAB or fastRed and the color of the transformed image is for example chosen such that it naturally reproduces the bright field image color of DAB or fastRed.

Transforming any one of the monochrome (i.e., "grey scale") first, second and/or third images (in the following referred to as the "source image") to a transformed version can be performed by a color transformation method known in the art, whereby the "color" of the monochrome digital image used as the input image is typically an intensity value within a predefined value range. Thus, the image transformation can also be described as an image "colorization" operation.

According to a first example for performing the image transformation into a desired bright field image color space, each pixel P in the source image (i.e., a fluorescent monochrome image or a brightness inverted version thereof) may have an intensity value between 0 and 255 and may be stored as an 8 bit number, with 0 representing no intensity and 255 representing full intensity. A particular source image pixel P may have an intensity value of 201. The task may now be to transform the pixel intensity value of 201 of the pixel P of the source image into an RGB value of the corresponding pixel TP in the transformed version of the source image, whereby in this case the transformed image version should "look like" an eosin-stained bright field image. In order to perform said task, the following operations may be performed by the image processing system:

accessing a configuration data structure; the configuration data structure specifies the "typical" RGB values for eosin-stained structures in bright field microscopy images; example, the following values may be specified for eosin in the configuration data structure: $R_{eosin}=240$, $G_{eosin}=117$, $B_{eosin}=240$;

compute the transformed pixel TP in the HLS color model, thereby using the "typical" RGB values specified for the desired color of the transformed image. In the given example, the transformation could be performed as follows:

take the grey scale value 201 of pixel P in the source image and use that as a percentage of the maximum possible intensity value of the intensity scale of the source image, e.g. 255. So if P has grey scale value 201 and the maximum possible intensity value is 255, then the equivalent pixel in the transformed, "colorized" image would be:

$$\text{colorized\_red} = \left(\frac{201}{255}\right) * R_{eosin} = \left(\frac{201}{255}\right) * 240 = 189;$$

$$\text{colorized\_green} = \left(\frac{201}{255}\right) * G_{eosin} = \left(\frac{201}{255}\right) * 117 = 92;$$

$$\text{colorized\_blue} = \left(\frac{201}{255}\right) * B_{eosin} = \left(\frac{201}{255}\right) * 240 = 189.$$

According to a second example for performing the image transformation into a desired bright field image color space, three parameters PR, PG and PB are defined for the red, green and blue channel of a desired bright field color of an rgb bright field image. Each of said parameter (also referred to as extinction coefficients) defines how strongly a substance respectively absorbs light at a given wavelength (e.g. "red", "green" and "blue") per density or per "molar concentration". For example, said three parameters can be empirically determined: a pathologist may stain a biological sample with a particular bright field image stains, e.g. hematoxylin. Then, the distribution of red, green, and blue pixel intensity levels in a bright field image of the sample is determined. Preferentially, the pixel intensity levels are normalized to a value between 0 and 1. Then, the one of the three RGB colors having the smallest value for mean-of-all-imagepixels(log(pixelintensity)) is identified. For example, said color could be "red". In this case, the three parameters PR ("parameter red"), PG("parameter green") and PB ("parameter blue") are computed as follows:

$$PR = \text{mean-of-all-}\textit{imagepixels}\left(\frac{(\log(\text{RED} - \textit{pixelintensity of pixel } px))}{(\log(\text{RED} - \textit{pixelintensity of pixel } px))}\right) = 1$$

$$PG = \text{mean-of-all-}\textit{imagepixels}\left(\frac{(\log(\text{GREEN} - \textit{pixelintensity of pixel } px))}{(\log(\text{RED} - \textit{pixelintensity of pixel } px))}\right)$$

$$PB = \text{mean-of-all-}\textit{imagepixels}\left(\frac{(\log(\text{BLUE} - \textit{pixelintensity of pixel } px))}{(\log(\text{RED} - \textit{pixelintensity of pixel } px))}\right)$$

The empirically determined parameters PR, PG and PB can then be used for transforming the fluorescent images (or a brightness inverted version thereof) to a brightfield image having a particular, desired bright field color.

For transforming a monochromatic fluorescence image into a bright field image having a particular, desired bright field color, e.g. the color of hematoxylin, the parameters PR, PG, PB can be used in a nonlinear transformation equation. The nonlinear transformation equation for transforming each pixel px in the fluorescence image into a respective pixel $px_{BF}$ in the RGB bright field image, in accordance with the formulas:

$$R_{pxBF}=255 \exp(-cr*PR*[\text{FSTAIN\_INT}_{px}])$$

$$G_{pxBF}=255 \exp(-cg*BR*[\text{FSTAIN\_INT}_{px}])$$

$$B_{pxBF}=255 \exp(-cb*BR*[\text{FSTAIN\_INT}_{px}])$$

The parameter $\text{FSTAIN\_INT}_{px}$ indicates the intensity value of the (monochromatic) fluorescent stain signal at pixel px in the fluorescent image (or brightness inverted fluorescence image) that corresponds to said fluorescent stain FSTAIN.

The parameters cr, cg, cb are constants that are multiplied with the extinction coefficients of the bright field image stain whose color shall be simulated. For example, the "desired" rgb color of hematoxylin may be rgb(102, 102, 255). Accordingly, the cr, cg and cb parameters for hematoxylin would be cr=102, cg=102 and cb=255. Then, the resulting $R_{pxBF}$, $R_{pxBF}$ and $R_{pxBF}$ values of the "simulated bright field image" can be normalized under preservation of their proportional values to a value between 0 and 255. Alternatively, the parameters cr, cg, cb are normalized under preservation of their proportional values to a value between 0 and 255. Alternatively, the parameters cr, cg, cb are such that the output color values ($R_{pxBF}$, $R_{pxBF}$ and $R_{pxBF}$) respectively lie in a range of 0-255.

According to embodiments, one or more of the biomarkers are cytosolic proteins selected from a group comprising a cytokeratin protein, FAP, actin, microtubulin or others.

According to embodiments, the first stain that generically stains biological matter is a fluorescent stain coupled to an antibody, whereby the antibody binds to a protein distributed at least in the cytosol of all cells in the tissue sample. The antibody may be an antibody that binds to a protein being constitutively expressed in the cells of the examined tissue, in particular in the cytosol, e.g. tubulin, microtubulin or actin in mammalian cells. For example, F-actin is a protein that forms a networked structure and typically spans large portions of the cytoplasm of a cell. Thus, an arbitrary fluorescent stain that is coupled to an antibody that generically binds to any kind of proteins or that binds to a particular, abundantly available cytosolic protein is used as the first stain.

The fluorescence stain coupled to said antibody (or other molecule generically binding to biological matter, in particular cytosolic proteins) can be, for example, selected from a group of fluorescent stains comprising Fluorescein and its derivates, e.g., isothiocyanate (FITC), Rhodamine and its derivates, e.g. Tetramethyl-rhodamine-5-(and 6)-isothiocyanate (TRITC), Cyanines (e.g. Cy2, Cy3, Cy5 and Cy7).

Alternatively, the first stain is a fluorescent stain that is selected from a group comprising, for example: periodic acid (a cell cytoplasm stain and a strong oxidizing agent); BCECF/AM; Astra Blue (a stain for oligo- and polysaccharides such as cellulose in plant tissues); Fast Green FCF (a widely utilized tissue and protein stain used in IEF & SDS-PAGE, fluoresces near IR); Phalloidin-tetramethylrhodamine conjugate (a fluorescent phallotoxin that can be used to identify filamentous actin); Fluorescein 5(6)-isothiocyanate (a fluorescent labeling reagent for proteins) or any fluorescent stain binding to basic molecules and thus having a similar staining pattern like eosin.

In addition, it is also possible to use non antibody-coupled fluorescent stain for staining specific sub-cellular compartments, e.g. the nuclear regions. For example, DAPI (a cell-permeable DNA-binding dye preferential to adenine and thymine rich DNA) can be used for staining nuclear regions. A monochromatic image representing the fluorescent DAPI signals can be transformed for example into an image having a color that naturally reproduces the color of hematoxylin, thereby generating an "artificial" hematoxylin image from a DAPI fluorescent image.

According to embodiments, the method further comprises staining the tissue sample with the one or more second fluorescence stains and optionally with the one or more first fluorescence stains and/or the third fluorescence stains; and acquiring the digital fluorescence images of the tissue sample with a fluorescence image acquisition system. Depending on the embodiment, the staining may be performed manually, semi-automatically or automatically. Preferentially, staining protocol data (the type of fluorescence stains used for detecting a respective biomarker and/or the generic presence of biological matter or nuclear regions used, staining conditions like temperature, pH value, duration, etc) is stored in a storage medium in association with a sample identifier of the sample that was stained when applying the staining protocol. The digital images can be acquired e.g. a fluorescence microscope or a fluorescence slide scanner.

In a further aspect, the invention relates to an image processing system for generating a simulated digital bright field IHC or ISH image from digital, monochromatic, fluorescence images of a tissue sample. The tissue sample comprises one or more stained biomarkers. Each of the stained biomarkers is stained by a respective fluorescence stain. The image processing system is configured for:
  receiving a first one of the fluorescence images of the tissue sample, the pixel intensities of the first image being generically indicative of the presence of biological matter;
  transforming the first image into a transformed first image having a first color;
  for each of the stained biomarkers, receiving a respective second one of the fluorescence images of the tissue sample, the pixel intensities of each second image being selectively indicative of fluorescence signals emitted by the fluorescence stain that selectively stains said biomarker,
  transforming each of the second images into a respective transformed second image having a respective second color;
  overlaying and combining the transformed first and one or more second images;
  storing the combined image as the simulated digital bright field IHC or ISH image in a storage medium; and/or
  displaying the combined image as the simulated digital bright field IHC or ISH image on a display device.

In a further aspect, the invention relates to a computer readable medium comprising instructions that when executed by a processor causes the processor to execute a method according to any one of the above embodiments.

The term "spectral unmixing" or "color deconvolution" as used herein is the procedure by which the measured spectrum of a mixed pixel is decomposed into a collection of constituent spectra, and a set of corresponding fractions that indicate the proportion of each constituent spectrum present in the pixel. Constituent spectra normally correspond to specific fluorescence stains and their emission spectrum.

An "image processing system" as used herein is an electronic apparatus comprising one or more processors that is configured for processing digital images.

Immunohistochemistry ("IHC") refers to the process of detecting antigens (e.g. proteins) in cells of a tissue section by exploiting the principle of antibodies binding specifically to antigens in biological tissues. IHC takes its name from the roots "immuno", in reference to antibodies used in the procedure, and "histo" meaning tissue (compare to immunocytochemistry). Immunohistochemical staining is widely used in the diagnosis of abnormal cells such as those found in cancerous tumors. Specific molecular markers are characteristic of particular cellular events such as proliferation or cell death (apoptosis). Immunohistochemistry is also widely used in basic research to understand the distribution and localization of biomarkers and differentially expressed proteins in different parts of a biological tissue. Visualising an antibody-antigen interaction can be accomplished in a number of ways. For example, the antibody can be tagged to a fluorophore, such as fluorescein or rhodamine. An "IHC" image as used herein is a digital image depicting an immuno-histochemically stained tissue sample.

In situ hybridization ("ISH") is a type of hybridization that uses a labeled complementary DNA, RNA or modified nucleic acids strand (i.e., probe) to localize a specific DNA or RNA sequence in a portion or section of tissue (in situ), or, if the tissue is small enough (e.g., plant seeds, Drosophila embryos), in the entire tissue (whole mount ISH), in cells, and in circulating tumor cells (CTCs). While immunohistochemistry usually localizes proteins in tissue sections, in situ hybridization typically localizes nucleic acids in tissue sections. An "ISH" image as used herein is a digital image depicting an in situ hybridization stained tissue sample.

A "bright field IHC or ISH image as used herein is a digital image depicting an in IHC or ISH sample having been stained with a bright field image stain and being the visual output generated by a bright field microscope.

A "stain" or "dye" as used herein is a substance that has a characteristic light absorbance spectrum (bright field imaging stain) and/or fluorescence emission spectrum (fluorescence stain) and that can be coupled by various means to biological material. The coupling may be based on the physicochemical properties of the stain and the biological material (e.g. stains selectively binding to acid molecules like DNA), may be based on coupling the stain to an antibody that binds to a particular protein, nucleic acid or other biological material, may be based on a genetic modification of a protein as to couple the stain (e.g. in form of the green fluorescent protein) to said genetically modified protein or any other way of coupling a stain to biologic material.

Bright-field microscopy is the simplest of all the optical microscopy illumination techniques. Sample illumination is transmitted (i.e., illuminated from below and observed from above) white light and contrast in the sample is caused by absorbance of some of the transmitted light in dense areas of the sample. Bright-field microscopy is commonly used for illumination of samples in light microscopes and its simplicity makes it a popular technique. The typical appearance of a bright-field microscopy image is a dark sample on a bright background, hence the name. In bright field imaging, a set of well commonly staining substances such as eosin, hematoxylin, Giemsa, Coomassie Blue and others are known with well-known binding characteristics which depend on physic-chemical properties of the biological matter, e.g. the acidity of DNA or of the presence of basic groups within a protein.

A "simulated bright field image" as used herein is a digital image generated by an image processing operation which assigns a predefined color to a particular pixel in dependence on the biological material or structure (e.g. any kind of protein, a cell nucleus or a specific biomarker) represented by said pixel. Thus, the property of bright field images that stains are typically linked via their physic-chemical properties to defined biological structures, e.g. acidic or basic tissue or cell components, is "simulated". Optionally, a simulated bright field image as used herein has further properties of a typical bright field image, e.g. a bright (non-tissue) background instead of a black (non-tissue) background and/or colors which naturally reproduce the colors of well-known stains used in bright field images such as eosin, hematoxylin and eosin in the same type of biological structures stained by said bright field image stains. The image is "simulated" as it is actually computed from a set of monochromatic images captured by a fluorescence image capturing device.

BRIEF DESCRIPTION OF THE DRAWINGS

In the following embodiments of the invention are explained in greater detail, by way of example only, making reference to the drawings in which.

DETAILED DESCRIPTION

Figure 1:
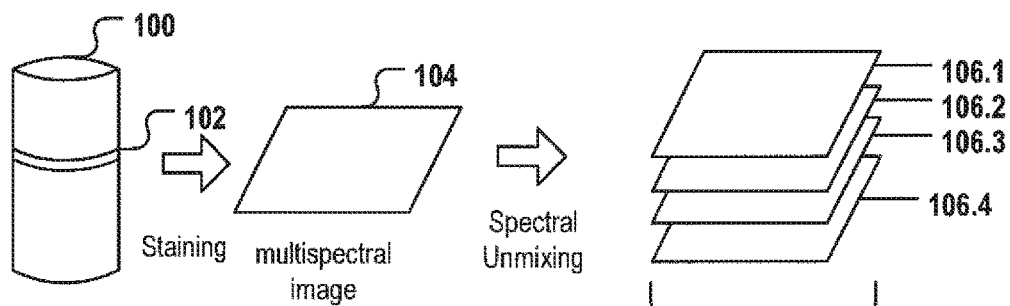
FIG. 1 depicts the acquisition of multiple monochrome images from a multispectral image via color deconvolution.

FIG. 1 depicts the acquisition of multiple monochrome images from a multispectral image via color deconvolution.

At first a tissue sample is provided. For example, as part of the diagnosis of many cancer types, e.g. colorectal cancer, one or more biopsy samples are taken. The biopsy sample is sliced into one or more thin tissue layers 102. The layer 102 may be stained with one or more fluorescence stains selectively staining specific biomarkers, cells and/or organelles, and a multispectral image 104 is taken from one layer 102 to capture meaningful biomedical features that may allow classifying the tumor and/or may allow predicting the clinical outcome and/or generating a treatment recommendation. An image acquisition system, e.g. a slide scanner or microscope may acquire a multispectral image 114 which may comprise spectral information of a plurality of different fluorescence stains and may comprise autofluorescence signals of the tissue layer 102 on the slide. The multi spectral image 104 may be a whole slide image and thus may be very large. By applying a spectral unmixing procedure, a plurality of digital images 106-1-106.4 is created. Thus, a set 112 of monochromatic, fluorescence digital images 106.1-106.4 of the same layer 102 of a tissue sample 100 is created. At least some of the images in set 112 may correspond to the intensity signals selectively generated by a respective biomarker specific, fluorescence stain and thus may correspond to a particular biomedical feature, e.g. the presence and distribution of a particular biomarker. At least one of said monochrome fluorescence images is an image selectively indicating an autofluorescence signal of the tissue. Alternatively, one further monochromatic image ("first image") (not shown) is computationally generated by overlying and combining multiple monochromatic fluorescence images depicting cytosolic and nuclear and/or membrane biomarkers. Each of the images 106.1-106.4 may be processed and analyzed by an image processing system as depicted, for example, in FIG. 6 for generating a simulated, "virtual" bright field image from transformed versions of the monochromatic fluorescence images 106.1-106.4.

The image acquisition system 302 may provide the multispectral image 104 to an image processing system 306 which performs the color deconvolution for generating the first and second monochromatic fluorescence images and which also performs the image transformation and combining operations for generating the simulated bright field image. Alternatively, the color deconvolution may be performed already by the image acquisition system 304 and the generated monochrome fluorescence images generated as output by the color deconvolution operation are stored in a storage medium that is accessible to the image processing system 306.

Figure 2:
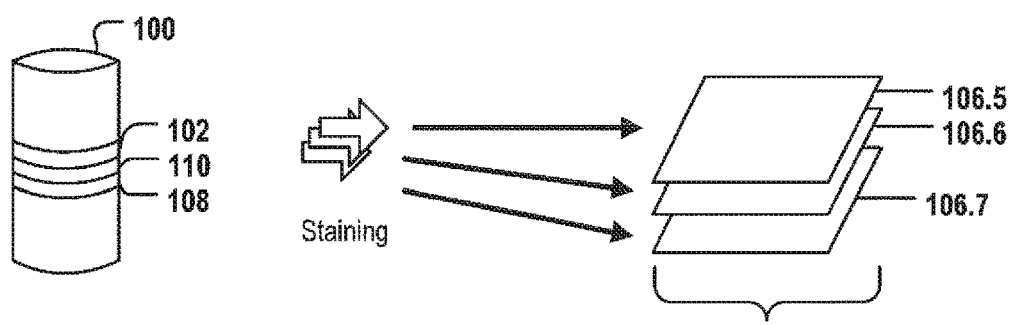
FIG. 2 depicts an alternative way of acquiring multiple monochrome images of a sample.

FIG. 2 depicts an alternative way of acquiring multiple monochrome fluorescence images of a tissue sample.

Again, a tissue sample is provided, e.g. a tissue sample of a patient suspected of having a tumor or another disease that can be detected by means of immuno-fluorescence image analysis.

The biopsy sample is sliced into a plurality of thin, adjacent tissue layers 102, 108, 110. Each tissue layer 102, 108, 110 is stained with a fluorescence stain selectively staining specific biomarkers, cells and/or organelles or which unspecifically stain any biological matter contained on the slide. Each tissue layer may be stained with a different staining protocol and may be transferred on a respective slide. For each of the layers and corresponding stains, a corresponding monochrome fluorescence image 106.5-106.7 is taken to capture meaningful biomedical features that may allow classifying the tumor and/or may allow predicting the clinical outcome and/or generating a treatment recommendation. An image acquisition system, e.g. a slide scanner or microscope sequentially or in parallel captures fluorescence signals emitted by the stained, adjacent tissue slices 102, 108, 110 and acquires a respective monochrome fluorescence image. Each of the images 106.5-106.7 may comprise spectral information of a particular fluorescence stain and may comprise autofluorescence signals of any tissue or biological structure on the slide. As for the example depicted in FIG. 1, the images may be whole slide images and thus may often be very large.

As the tissue slices are thin (typically thinner than 300 μm), e.g. about 200 μm or less, overlaying the images derived from different slices will still allow to combine and overlay the images derived for different layers for generating a combined, simulated bright field image that comprises biological meaningful graphical information that can be interpreted by a pathologist.

According to a still further embodiment (not shown), a plurality of fluorescence monochrome images of the tissue sample is generated by using multiple fluorescence filters.

For example, a particular tissue slice 102 is stained with multiple different fluorescence stains, each stain having a different color and binding to a different biomarker, e.g. a plurality of different cytosolic, nuclear and/or membrane proteins. A light source may be used to excite the emission of a fluorescence signal by a respective fluorescence stains.

In some example, a broad spectrum light source is used. This may bear a risk that multiple fluorescence stains with overlapping emission spectra are excited which may result in an intermixing of the fluorescence signals emitted by the different fluorescence stains. This could result in problems when trying to discern the signals corresponding to different biomarkers. According to some embodiments, fluorescence filters are used to selectively receive fluorescence signal in a specific spectral range that is characteristic for a particular fluorescence stain and thus is characteristic for the biological structure that was stained by said fluorescence stain. By using a respective fluorescence filter for each of the fluorescence stains used (the fluorescent light emission spectrum of each fluorescence stain is known), a monochromatic fluorescence image is acquired which selectively comprises fluorescence signal intensities corresponding to a particular one of the fluorescence stains.

Figure 3:
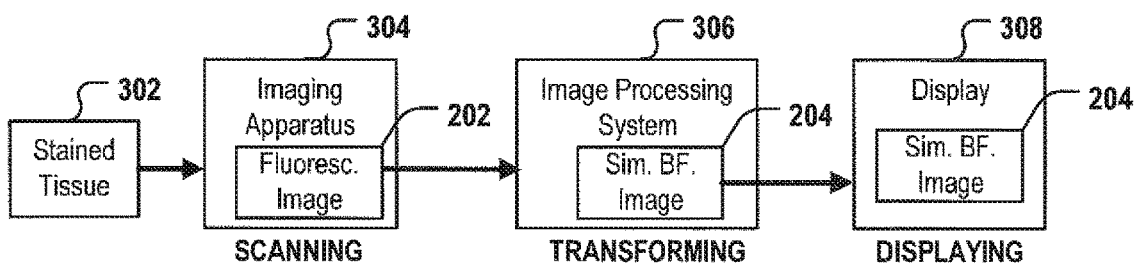
FIG. 3 is a block diagram of an image processing pipeline.

FIG. 3 is a block diagram of an image processing pipeline. An automated tissue staining system or a lab worker may apply a staining protocol for staining one or more tissue samples 302, 100 or parts 102, 108, 110 thereof with one or more fluorescence stains. The stained tissue samples are transferred to respective tissue slides and the slides are loaded into an image acquisition apparatus 304, e.g. a fluorescent slide scanning device or a fluorescence microscope or the like.

The image acquisition apparatus 304 acquires a multispectral image 104 that is transformed by a spectral unmixing procedure into a plurality of monochrome fluorescence images 202, 106.1-106.4 as described for FIG. 1. Color deconvolution can alternatively be performed by the image processing system 306 receiving the multispectral image 104 from the image acquisition apparatus 304.

Alternatively, the image acquisition apparatus 304 directly acquires a plurality of monochrome fluorescence images 202, 106.5-106.7 from multiple adjacent tissue slices respectively acting as a tissue sample as described in the figure description of FIG. 2. According to a further alternative embodiment, the image acquisition apparatus 304 acquires the plurality of monochrome fluorescence images 202, 106.5-106.7 by applying multiple different fluorescence filters.

Figure 6:
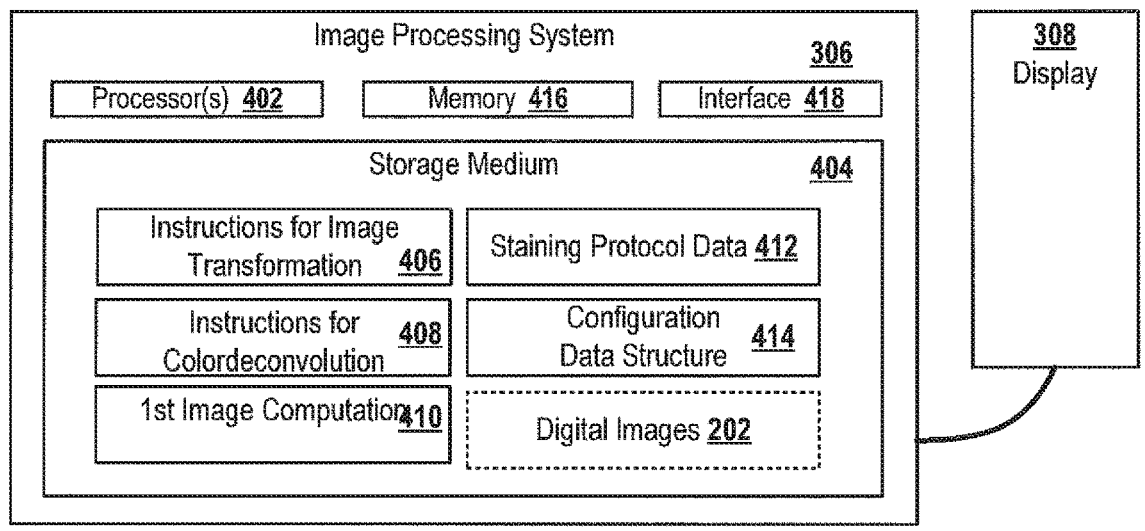
FIG. 6 is a block diagram of an image processing system.

After having acquired the plurality of monochrome fluorescence images according to anyone of the above described approaches and after said images where received and/or generated by the image processing system 306, the image processing system 306 starts to transform and combine subsets of the monochrome fluorescence images for generating a simulated bright field image 204 as described herein for embodiments of the invention. An exemplary and more detailed description of the components of the image processing system 306 as depicted in FIG. 6. The generated simulated bright field image 204 is stored in a non-volatile storage medium and/or is displayed on a display device 308 to a pathologist.

Figure 4:
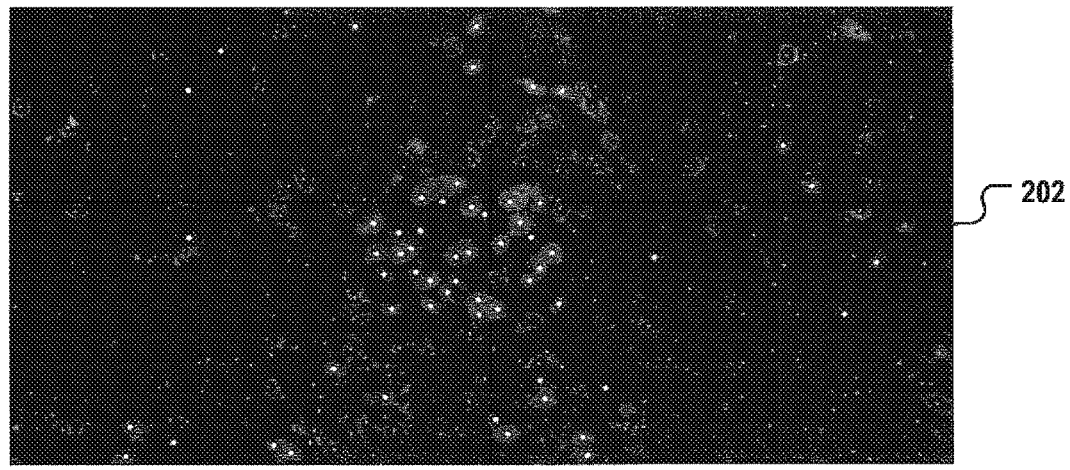
FIG. 4 depicts a fluorescence image wherein multiple different biomarkers are stained with differently colored fluorescence stains.

FIG. 4 depicts an overlay of multiple fluorescence images 202 wherein multiple different biomarkers are stained with fluorescence stains of different color. The non-tissue background regions of the fluorescence image have a black color. The number and distribution of the various fluorescence stains is complex. A pathologist may have to carefully and manually inspect a staining protocol in order to find out what fluorescent color corresponds to what kind of biomarker.

Figure 5:
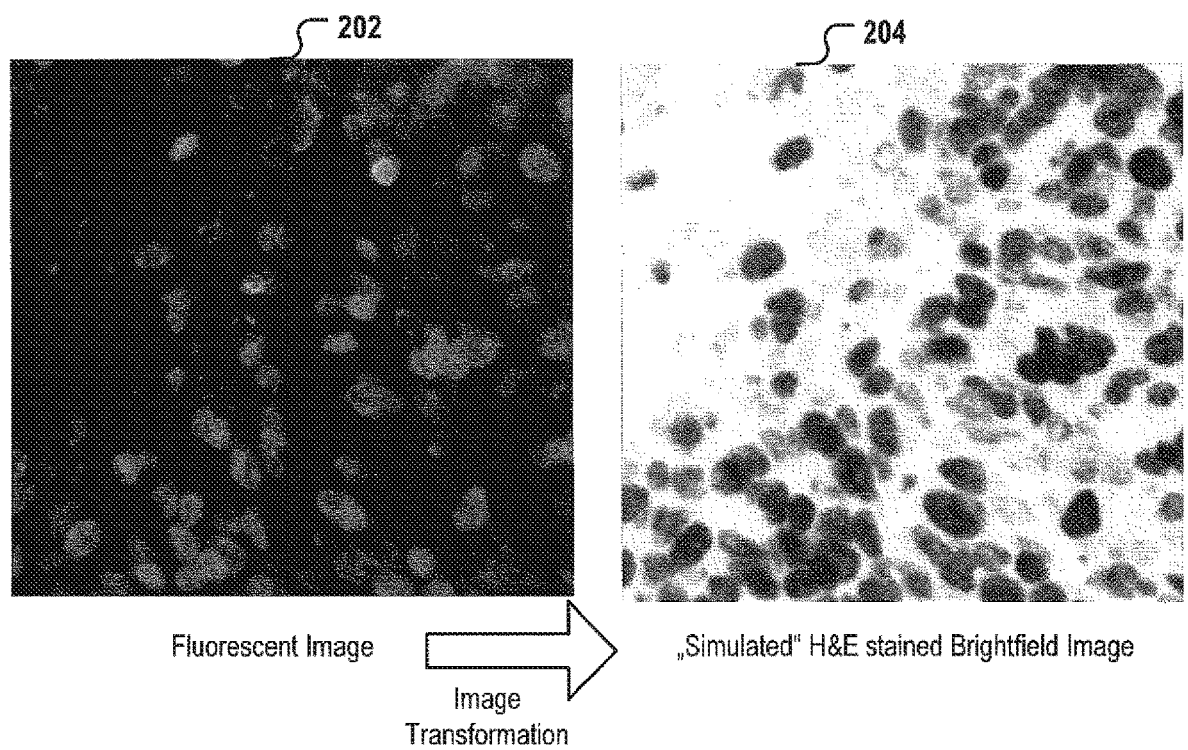
FIG. 5 depicts the transformation of a fluorescence image into a simulated bright field image.

FIG. 5 depicts the transformation of a fluorescence image into a simulated bright field image 204. More particularly, the simulated bright field image simulates a H&E stained tissue section wherein nuclei are colorized with hematoxylin-blue and cytosolic proteins are stained with eosin-pink as a result of a transformation step applied on the respective fluorescence image. The black image background of the fluorescence images 202 are transformed into a white background typical for bright field images by inverting the pixel intensities of the transformed ("colorized") fluorescence images.

FIG. 6 is a block diagram of an image processing system 306. The system comprises a main memory 416, one or more processors 402 and an interface 418 for receiving multispectral and/or monochrome fluorescence images from a non-volatile storage medium 404 and/or from an image acquisition system 304. For example, the interface 418 may be a network interface and the image acquisition system 304 may be connected to the image processing system 306 via a network, e.g. the Internet. A "non-volatile storage medium" as used herein is a type of memory that can retrieve stored information even after having been power cycled (turned off and back on). Examples of non-volatile storage media include read-only memory, flash memory, ferroelectric RAM (F-RAM), most types of magnetic computer storage devices (e.g. hard disk drives, floppy disks, and magnetic tape) and optical discs.

The image processing system 306 is operatively coupled to a display device 308, e.g. an LCD display, a bi-stable display or any other form of electronic display system. The non-volatile storage medium 404 of the image processing system may comprise a plurality of digital instructions that can be interpreted and executed by the processors 402 and which implement the image processing method for generating a simulated bright field image according to embodiments of the invention described herein. The instructions may comprise first instructions 406 for transforming each of a plurality of (first, second and optionally also thought) monochromatic fluorescence images into a respective transformed image of a particular color. The color of the transformed images depends on the biological structure to which the fluorescence stain from which the input image of the transformation has bound. The biological structure may be a specific biomarker, e.g. a specific protein located in the cytoplasm, nucleus or cell membrane.

Regarding the transformation of the first image, the stained biological structure may be the totality of biological material stained by a generically binding (e.g. non-specifically binding) fluorescence stain or stained by a plurality of different fluorescence stains targeting different biological structures which are later combined for generating a simulated, fluorescence monochromatic first image. Alternatively, the "stained biological structure" may in fact be the totality of biological material on the slide capable of emitting and autofluorescence signal.

The assignment of biological structure whose presence is indicated by the pixel intensities of any one of the monochrome fluorescence images 202 to the color of the image into which said monochrome fluorescence image shall be transformed is stored in a configuration data structure in the storage medium 404.

For example, a particular biomarker B1 may be assigned to a second color C1 characterized by a specific RGB value RGB1. A further biomarker B2 may be assigned to a further second color C2 characterized by a further specific RGB value RGB2. A still further biomarker B3 may be assigned to a still further second color C3 characterized by a specific RGB value RGB3. Said assignments and the typical RGB values of the bright field microscopy stains are stored in a configuration data structure 414. Thus, the configuration data structure may indicate typical RGB values of a plurality of different stains such as DAB, hematoxylin and/or eosin commonly used in bright field image microscopy. The storage medium may further comprise staining protocol data 412 being indicative of the type of fluorescence stain used for staining a particular biomarker. If the staining protocol data is indicative that no generic fluorescence stain was used for generating the first image, the image processing system 306 may automatically compute the first image by overlying and combining all available, biomarker specific second fluorescence images or may automatically transform an image comprising autofluorescence signals into a transformed first image having a color typically used for tissue background staining in bright field image microscopy, e.g. the pink color of eosin.

The instructions may comprise further instructions 408 for performing a color deconvolution operation in case the image analysis system is configured to receive multispectral fluorescence images from an image acquisition system via interface 418. In particular, the instructions 408 may comprise routines for obtaining an autofluorescence reference profile being typical for the type of tissue examined (e.g. liver tissue, lung tissue, muscle tissue) and use that autofluorescence reference profile for performing a color deconvolution of a multispectral image and for extracting an autofluorescence image that is generically indicative of the existence of biological matter on the tissue slide and that is used as the first image.

The instructions further comprise instructions four 104 computing a first monochrome image that is generically indicative of the existence of biological matter on the tissue slide by combining two or more biomarker specific, second monochrome fluorescence images 106.1-106.7.

Figure 7:
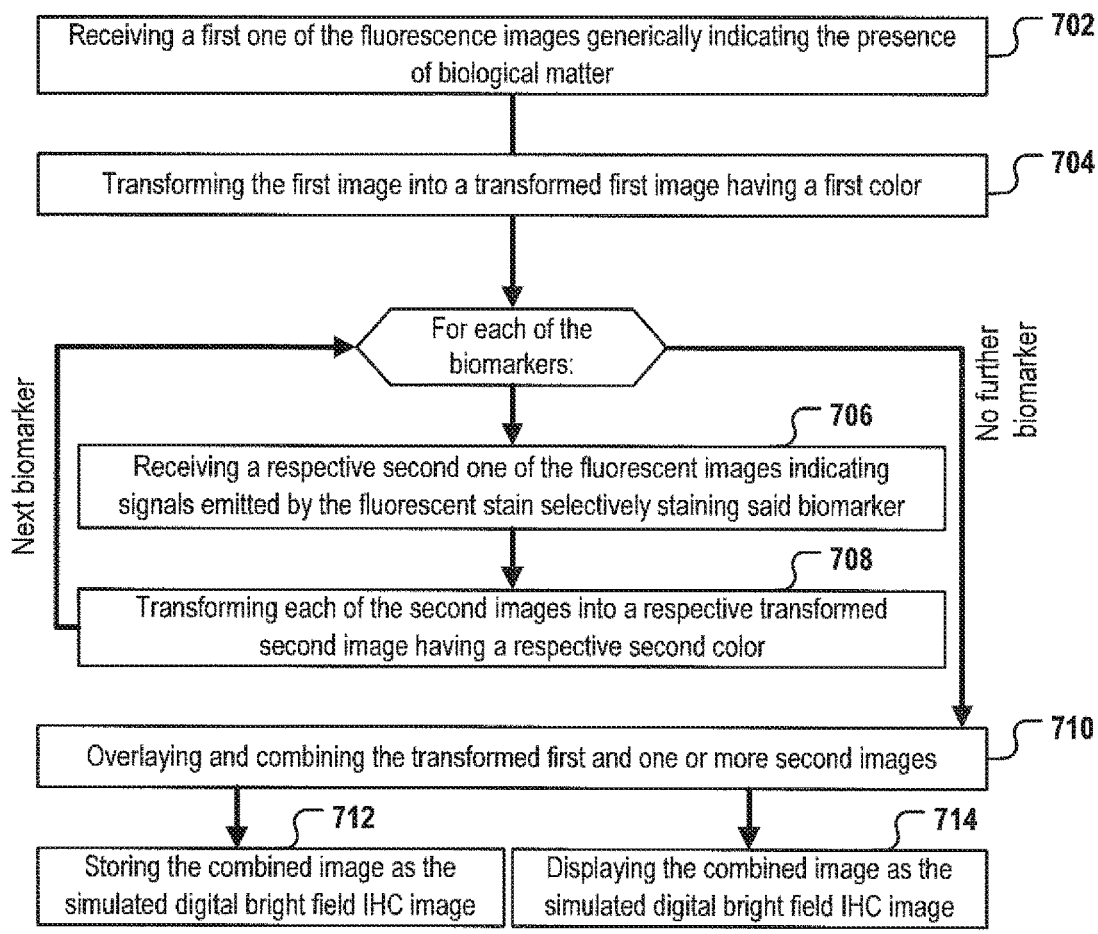
FIG. 7 is a flow chart of an image processing method.

FIG. 7 is a flow chart of an image processing method. For example, the methods may be implemented in the form of electronic instructions stored in a storage medium 404 of a image processing system as depicted and described, for example, in FIG. 6.

In a first step 702, the image processing system 306 receives a first fluorescence image that is generically indicative of the presence of biological matter 102, 108, 110 on a slide comprising a biological sample 100. For example, the first digital image may be provided by a color deconvolution operation performed by a processor 402 executing instructions 408 for extracting autofluorescence signals emitted by the biological sample. Alternatively, the first digital image may be generated by combining multiple biomarker specific monochrome fluorescence images, herein referred to as "second images. The generation of the first digital image may be implemented by instructions 410.

In a second step 704, the image analysis system transforms, by executing instructions 406, the first image into a transformed first image. The transformed first image had the first color that is specified in a configuration data structure 414. The first color preferentially is the color of a generic tissue stain commonly used in bright field image microscopy. An example of such a first color is the reddish/pink color of eosin.

For each of the one or more biomarkers stained while performing a staining protocol with a respective fluorescence stain, steps 706 and 708 are executed. In step 706, a fluorescence, monochrome image whose pixel intensities are selectively indicative of the presence of that biomarker is received by the image analysis system 306. That image is also referred herein as "second image". Each second image can be retrieved e.g. by reading the image from the storage medium 404 or receiving it via interface 418 from an image acquisition system. In step 708, each second image is transformed into a respective transformed second image, e.g. by executing instructions 406. Each transformed second image has a particular second color that is different from the second colors of all other transformed second images. The second color used for generating a second transformed image is specified in the configuration data structure 414. Preferentially, the image processing system 306 implements a graphical user interface that enables a pathologist to assign specific second colors to specific biomarkers. By using the same configuration for generating simulated bright field images for different tissue samples into different patients, the pathologist may ensure that a particular biomarker, e.g. a particular protein like FAP is always colorized with the same second color, e.g. a brown, DAB-like color irrespective of the color of the fluorescence stain used for staining the FAP protein. This is advantageous, because a particular biomarker can be stained by different laboratories with different staining kits. By generating transformed second images whose second color depends on the biomarker that is stained and that reproduces colors a pathologist having some experience in bright field image microscopy is already acquainted with, the productivity of the pathologist can be increased and diagnostic errors can be avoided.

In an additional image processing step (not shown), the brightness of each of the first, second and third transformed images is inverted. Thereby, image regions being free of a fluorescence signal are represented by high pixel intensity values which is typical for brightfield images.

In step 710, the first and second transformed images are overlaid and combined for generating a simulated bright field image 204. The step of "overlaying" implies mapping the different first and second transformed images to each other in a common coordinate system. Creating an overlay of the first and second transformed images is preferentially performed such that the first image is used as the lowest level image and all transformed second images are superimposed on top of the first image. This is because the transformed first image is indicative of the existence of biological matter and is used for discerning tissue regions on the slide from non-tissue regions and/or for discerning intra-cellular regions from extracellular regions. In case the image processing system has further generated a transformed third image which is indicative of nuclear regions of any kind of cells (which according to typical examples is transformed into a hematoxylin blue-color image), said that third image is placed on top of the first image but below each of the second transformed, biomarker specific images. The complete stack of overlaid first second and third transformed images is referred to as the combined, simulated bright field image. According to some embodiments, a graphic user interface is generated and presented to the pathologist that enables the pathologist to select a subset of transformed first, second and/or third images to be overlaid and combined for generating the simulated bright field image. This may be advantageous as the complexity of the visual information contained in the simulated bright field image is reduced. In case the pathologist does not want to see signals of all stained biomarkers at once, he or she may simply de-select biomarkers which are considered irrelevant at the moment. For example, the GUI may comprise a checkbox for each of the first, second and/or third transformed images and only the transformed images whose checkbox item was selected by the pathologist are overlaid and combined for generating the simulated bright field image 204.

In step 712, the image processing system 306 stores the set of combined first, second and/or third transformed images as a simulated bright field image in a storage medium 404. For example, the image can be stored as JPEG or any other known image format. In addition, or alternatively, the image processing system 306 displays the simulated bright field image 204 on a display device 308 that is coupled to the image processing system.

FIG. 8 schematically depicts the combination of multiple transformed fluorescence images for generating a simulated bright field image. A glass tissue slide 600 comprises regions 602 not covered by any tissue cells and comprises other regions 604, 606 covered by cells of various types. For example, a group of cells 604 depicted to the right may consist of stroma cells and a second group of cells 606 depicted to the right may consist of tumor cells. Each of the cells consists of a nuclear region 610, a cytosolic region 608 and a cell membrane 612.

Figure 8A:
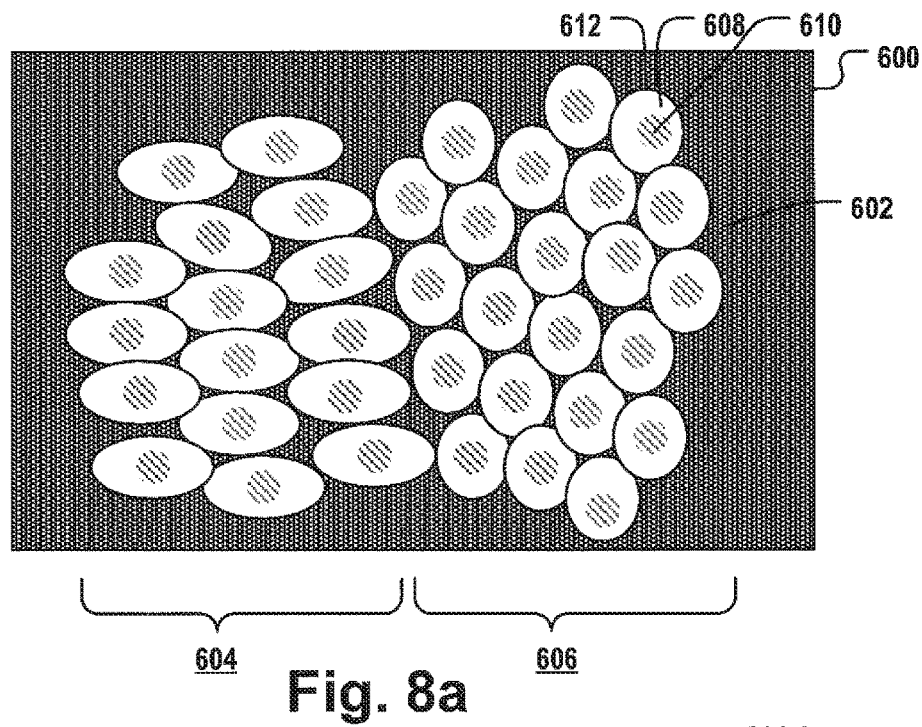
FIG. 8 schematically depicts the combination of multiple transformed fluorescence images for generating a simulated bright field image.

In a typical H&E stained tissue slide used in bright field image microscopy, the area is depicted in FIG. 8a have the following colors: the region 602 not covered by any cells is typically very bright (and may have an RGB value of approximately 255). Approximately all cells contained on the tissue slide are stained by eosin in pink because eosin binds to basic proteins which are present in the cytosol of almost any kind of cell. Moreover, approximately all nuclei of any cells contained on the tissue slide are stained by hematoxylin in blue because hematoxylin binds to the acidic DNA in the nucleus. Typically, H&E staining is used to help a pathologist to discern tissue regions 604, 606 from non-tissue regions 602 and for identifying nuclear, cytosolic and extracellular regions within the tissue sections.

Figure 8B:
Figure 8C:
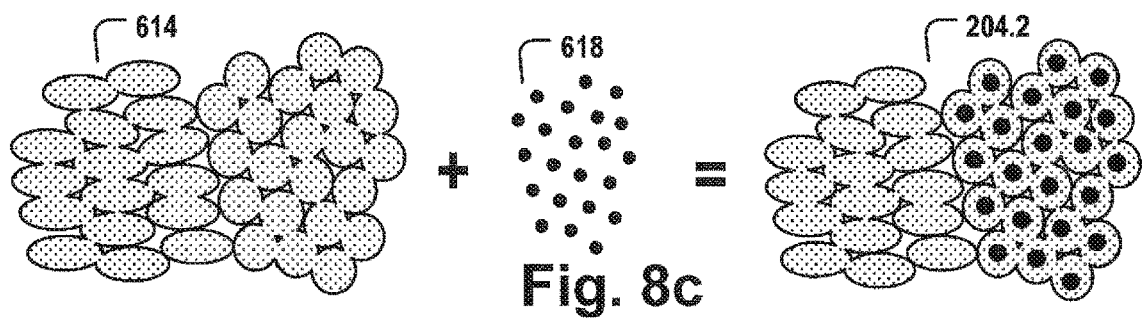
Figure 8D:
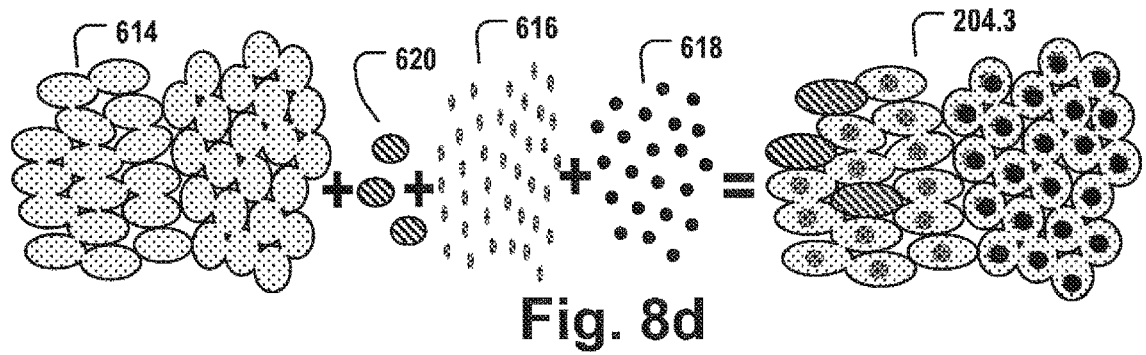

The following FIGS. 8b-8d illustrate how a combination of multiple biomarker specific fluorescence signals and of autofluorescence signals can be used for computationally generating (simulating) a bright field image of a tissue sample.

FIG. 8b depicts simulated bright field image 204.1 having been generated by overlaying and combining a transformed first monochrome fluorescence image 614 and a transformed second monochrome fluorescence image 616. The transformed first image 614 is a transformed autofluorescence image having been extracted from a multi-spectral image by applying a color deconvolution operation. The transformed first image comprises a cluster of high intensity pixel blobs 614 generically indicating the presence of biological matter, e.g. proteins, nucleic acids, fatty acids contained in every cell of the tissue irrespective of whether the cell is a normal tissue cell ("stroma cell") 604 or a tumor cell. The color of the transformed first image naturally reproduces the color of eosin.

The transformed second image 616 has been computed by colorizing a monochrome fluorescence image whose pixel intensities are indicative of a fluorescence stain that selectively stains the histone protein (a nuclear marker expressed in all kinds of mammalian cells). The transformed second image comprises a cluster of high intensity pixel blobs 616 generically indicating nuclear regions irrespective of whether the cell is a normal tissue cell ("stroma cell") 604 or a tumor cell 606. The color of the transformed second image naturally reproduces the color of hematoxylin.

By performing an intensity inversion on the first and second images 614, 616 and by overlaying and combining the first and second images, a bright field image 204.1 is simulated that naturally reproduces the color composition and distribution of a "real" bright field image the pathologist is acquainted with.

FIG. 8c depicts simulated bright field image 204.2 having been generated by overlaying and combining a transformed first monochrome fluorescence image 614 described above and a transformed further second monochrome fluorescence image 618. The transformed second image 618 has been computed by colorizing a monochrome fluorescence image whose pixel intensities are indicative of a fluorescence stain that selectively stains the Ki67 protein (a nuclear marker selectively expressed in proliferating cells). Ki67 is commonly used as a tumor marker for detecting strongly proliferating tumor cells. The transformed second image comprises a cluster of high intensity pixel blobs 618 selectively indicating nuclear regions of tumor cell 606. The color of the transformed second image may be specified in a configuration data structure and can be, for example, green.

By performing an intensity inversion on the first and second images 614, 618 and by overlaying and combining the first and second images, a bright field image 204.2 is simulated that naturally reproduces the color composition and distribution of a "real" bright field image stained with eosin and with a tumor specific green stain.

FIG. 8d depicts simulated bright field image 204.3 having been generated by overlaying and combining a transformed first monochrome fluorescence image 614 and a transformed second monochrome fluorescence image 616 described for FIG. 8b, a further transformed second image 618 described for FIG. 8c, and a still further transformed second image 620. The pixel intensities of the transformed second image 620 are indicative of a fluorescence stain that selectively stains an immune cell marker, e.g. the CD3 protein. CD3 detection may allow the detection of immune cells in the vicinity of a tumor. The color of the transformed second image 620 may be specified in a configuration data structure and can be, for example, DAB-brown.

By performing an intensity inversion on the first and second images 614, 616, 618, 620 and by overlaying and combining the first and second images, a bright field image 204.3 is simulated that naturally reproduces the color composition and distribution of a "real" bright field image stained with eosin (generic staining of any kind of protein in image 614), DAB (image 620 depicting CD3+immune cells), hematoxylin (image 616 depicting nuclear regions comprising histones) and a green stain (image 618 depicting Ki67+tumor cells).

The invention claimed is:

1. A method of generating a simulated digital bright field immunohistochemistry (IHC) or in situ hybridization (ISH) image from digital, monochromatic, fluorescence images of a tissue sample, the tissue sample comprising one or more stained biomarkers, each of the stained biomarkers being stained by a respective fluorescence stain, the method being performed by an image processing system and comprising:
  generating at least a first one of the fluorescence images and generating a second one of the fluorescence images for each of the stained biomarkers, the pixel intensities of the first image being generically indicative of the presence of biological matter, the pixel intensities of each second image being selectively indicative of fluorescence signals emitted by the fluorescence stain that selectively stains said biomarker, the generation of the first and second images comprising performing spectral unmixing of a multi-spectral digital image of the tissue sample, the generation further comprising:

receiving an autofluorescence reference spectrum of the tissue sample or of a similar tissue sample and using the autofluorescence reference spectrum in the spectral unmixing for the generation of the first image; or receiving a first fluorescence reference spectrum of the first stain which generically binds to biological matter of the tissue sample; and using said first received fluorescence reference spectrum in the spectral unmixing for the generation of the first image; and receiving a second fluorescence reference spectrum of each of the fluorescence stains used for staining the one or more biomarkers; and using each of the received second fluorescence reference spectra for the generation of a respective one of the one or more monochromatic second image;

receiving the first fluorescence image of the tissue sample;

transforming the first image into a transformed first image having a first color;

for each of the stained biomarkers, receiving the respectively created second fluorescence image of the tissue sample, transforming each of the second images into a respective transformed second image having a respective second color;

overlaying and combining the transformed first and one or more second images;

storing the combined image as the simulated digital bright field IHC or ISH image in a storage medium; and/or displaying the combined image as the simulated digital bright field IHC or ISH image on a display device.

2. The method of claim 1, the pixel intensities of the first image being selectively indicative of autofluorescence signals emitted by biological matter in the tissue sample.

3. The method of claim 1, the pixel intensities of the first image being selectively indicative of fluorescence signals emitted by a first fluorescence stain which generically binds to biological matter of the tissue sample.

4. The method of claim 1, further comprising:
generating the first image by overlaying and combining the pixel intensities of two or more of the second images, said two or more second images having been received for two or more of the biomarkers, said two or more biomarkers comprising:
one or more cytosolic biomarkers;
and optionally one or more nuclear biomarkers and/or one or more membrane biomarkers.

5. The method of claim 1, the first color being the color of eosin in a bright field image of an eosin-stained sample.

6. The method of claim 1, the one or more second colors being colors of substances used as bright field microscopy stains, the substances being e.g. selected from a group of comprising: diaminobenzidine; 3-AMINO-9-ETHYLCAR-BAZOLE (AEC); 4-CHLORO-1-NAPHTHOL (CN); p-PHENYLENEDIAMINE DIHYDROCHLORIDE/pyrocatechol; fast red TR; fast blue BB; New Fuchsin; Fast Garnet GBC; Nitro Blue Tetrazolium (NBT); and iodonitrotetrazolium Violet.

7. The method of claim 1, at least one of the one or more biomarkers being a nuclear biomarker and the second color of the second image received for said at least one biomarker being the color of hematoxylin in a bright field image of a hematoxylin-stained sample.

8. The method of claim 1, the method further comprising:
receiving a third one of the fluorescence images of the tissue sample, the pixel intensities of the third image being selectively indicative of fluorescence signals emitted by a third fluorescence stain which selectively stains nuclear regions;
transforming the third image into a transformed third image having a third color;
wherein the transformed first, third and the one or more second images are overlaid and combined to provide the combined image.

9. The method of claim 1, further comprising:
generating a third image by overlaying and combining the pixel intensities of two or more of the second images, said two or more second images having been received for two or more of the biomarkers, said two or more biomarkers being nuclear biomarkers;
transforming the third image into a transformed third image having a third color;
wherein the transformed first, third and the one or more second images are overlaid and combined to provide the combined image.

10. The method of claim 8, the third color being the color of hematoxylin in a bright field image of a hematoxylin-stained sample.

11. The method of claim 1, the method further comprising:
performing a brightness inversion of each of the monochrome fluorescent images for respectively generating a brightness-inverted, monochrome fluorescent image, wherein the transformation is performed on the brightness-inverted, monochrome fluorescent images for respectively generating the first and second and optionally third transformed images that are overlaid and combined for obtaining the simulated bright field image.

12. The method of claim 8, the method further comprising:
generating the third image of the tissue sample by performing the spectral unmixing of the multi-spectral digital image;
receiving a third fluorescence reference spectrum of a fluorescence stain used for staining the nuclear region; and using the received third fluorescence reference spectrum for the generation of the third image.

13. The method of claim 1, the method further comprising:
accessing, by the image processing system, staining protocol data being indicative of the types of fluorescence stains used for staining the one or more biomarkers and optionally being indicative of the fluorescence stain used for generically staining the biologic matter and/or for staining the nuclear regions;
in dependence on the fluorescence stains used according to the staining protocol data, selecting one of a plurality of transformation procedures for generating the transformed first, one or more second and optionally the third images.

14. The method of claim 7, the third fluorescence stain which selectively stains nuclear regions being a fluorescence stain selectively binding to Ki67 protein.

15. The method of claim 7, the one or more biomarkers being selected from a group comprising: Fibroblast activation protein alpha (FAP gene product); Pan cytokeratin; CD34; CD3; CD4; CD8; CSF1R; DR5; KI67; Perforin; CC3.

16. The method of claim 1, one or more of the biomarkers being cytosolic proteins selected from a group comprising: a cytokeratin protein; FAP; actin; microtubulin.

17. The method of claim 1, the first stain generically staining biological matter being selected from a group comprising:
  a fluorescent stain coupled to an antibody binding to a protein distributed at least in the cytosol of all cells in the tissue sample;
  periodic acid;
  BCECF/AM;
  Astra Blue;
  Fast Green FCF;
  Phalloidin-tetramethylrhodamine conjugate;
  Fluorescein-5-6-isocyanate.

18. The method of claim 1, further comprising:
  Staining the tissue sample with the one or more second fluorescence stains and optionally with the one or more first fluorescence stains and/or the third fluorescence stains; and
  acquiring the digital fluorescence images of the tissue sample with a fluorescence image acquisition system.

19. An image processing system for generating a simulated digital bright field immunohistochemistry (IHC) or in situ hybridization (ISH) image from digital, monochromatic, fluorescence images of a tissue sample, the tissue sample comprising one or more stained biomarkers, each of the stained biomarkers being stained by a respective fluorescence stain, the image processing system being configured for:
  generating at least a first one of the fluorescence images and generating a second one of the fluorescence images for each of the stained biomarkers, the pixel intensities of the first image being generically indicative of the presence of biological matter, the pixel intensities of each second image being selectively indicative of fluorescence signals emitted by the fluorescence stain that selectively stains said biomarker, the generation of the first and second images comprising performing spectral unmixing of a multi-spectral digital image of the tissue sample, the generation further comprising:
  receiving an autofluorescence reference spectrum of the tissue sample or of a similar tissue sample and using the autofluorescence reference spectrum in the spectral unmixing for the generation of the first image; or receiving a first fluorescence reference spectrum of the first stain which generically binds to biological matter of the tissue sample; and using said first received fluorescence reference spectrum in the spectral unmixing for the generation of the first image; and
  receiving a second fluorescence reference spectrum of each of the fluorescence stains used for staining the one or more biomarkers; and using each of the received second fluorescence reference spectra for the generation of a respective one of the one or more monochromatic second image;
  receiving the first fluorescence images of the tissue sample;
  transforming the first image into a transformed first image having a first color;
  for each of the stained biomarkers, receiving the respectively created second fluorescence image of the tissue sample,
  transforming each of the second images into a respective transformed second image having a respective second color;
  overlaying and combining the transformed first and one or more second images;
  storing the combined image as the simulated digital bright field IHC or ISH image in a storage medium; and/or
  displaying the combined image as the simulated digital bright field IHC or ISH image on a display device.

* * * * *

UNITED STATES PATENT AND TRADEMARK OFFICE
CERTIFICATE OF CORRECTION

| | | |
|---|---|---|
| PATENT NO. | : 10,846,848 B2 | Page 1 of 1 |
| APPLICATION NO. | : 16/304979 | |
| DATED | : November 24, 2020 | |
| INVENTOR(S) | : Eldad Klaiman | |

It is certified that error appears in the above-identified patent and that said Letters Patent is hereby corrected as shown below:

On the Title Page

(71) Applicant should read as: Hoffmann-La Roche Inc. Little Falls, NJ (US)

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*